United States Patent
Zeng et al.

(10) Patent No.: US 10,800,155 B2
(45) Date of Patent: Oct. 13, 2020

(54) GENERATION OF THREE-DIMENSIONAL OBJECTS

(71) Applicant: Hewlett-Packard Development Company, L.P., Spring, TX (US)

(72) Inventors: Jun Zeng, Palo Alto, CA (US); Sebastia Cortes I Herms, Sant Cugat del Valles (ES); Scott A. White, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 2 days.

(21) Appl. No.: 16/241,860

(22) Filed: Jan. 7, 2019

(65) Prior Publication Data

US 2019/0134970 A1 May 9, 2019

Related U.S. Application Data (63) Continuation of application No. 15/307,745, filed as application No. PCT/US2014/056789 on Sep. 22,
(Continued)

(51) Int. Cl.
*B33Y 10/00* (2015.01)
*G06T 19/20* (2011.01)
(Continued)

(52) U.S. Cl.
CPC .............. *B33Y 10/00* (2014.12); *B33Y 30/00* (2014.12); *B33Y 50/02* (2014.12); *G05B 19/042* (2013.01);
(Continued)

(58) Field of Classification Search
CPC ......... B33Y 10/00; B33Y 30/00; B33Y 50/02; G05B 19/042; G05B 2219/49023; G06T 19/20; G06T 2219/2004
See application file for complete search history.

(56) References Cited

U.S. PATENT DOCUMENTS 7,833,001 B2  11/2010  Silverbrook
8,070,473 B2  12/2011  Kozlak
(Continued)

FOREIGN PATENT DOCUMENTS

CN   101326046 A   12/2008
CN   103136792 A    6/2013
(Continued)

OTHER PUBLICATIONS

International Search Report and Written Opinion dated May 1, 2015, PCT Patent Application No. PCT/US2014/056789 dated Sep. 22, 2014, Korean Intellectual Property Office, 9 pages.
(Continued)

*Primary Examiner* — Yuhui R Pan
(74) *Attorney, Agent, or Firm* — HP Inc. Patent Department (57) ABSTRACT

According to one example, there is provided a system for managing the generation of three-dimension objects by an additive manufacturing system. The system comprises a processor to receive one or multiple virtual objects, to generate a spatial arrangement of those objects within a virtual build volume, to control an additive manufacturing system to process the virtual build volume, to modify the virtual build volume in response to a request, and to control the additive manufacturing system to process the modified virtual build volume.

15 Claims, 5 Drawing Sheets

Related U.S. Application Data 2014, now Pat. No. 10,201,961, which is a continuation-in-part of application No. PCT/US2014/053405, filed on Aug. 29, 2014.

(51) Int. Cl.
  *B33Y 30/00* (2015.01)
  *B33Y 50/02* (2015.01)
  *G05B 19/042* (2006.01)

(52) U.S. Cl.
  CPC .... *G06T 19/20* (2013.01); *G05B 2219/49023* (2013.01); *G06T 2219/2004* (2013.01)

(56) References Cited

U.S. PATENT DOCUMENTS

| | | |
|---|---|---|
| 2004/0251581 A1 | 12/2004 | Jang et al. |
| 2006/0085088 A1 | 4/2006 | Nakayama et al. |
| 2012/0105903 A1 | 5/2012 | Pettis |
| 2012/0287470 A1 | 11/2012 | Pettis |
| 2014/0025529 A1 | 1/2014 | Honeycutt et al. |
| 2014/0034214 A1 | 2/2014 | Boyer et al. |
| 2014/0039659 A1 | 2/2014 | Boyer et al. |
| 2014/0074274 A1 | 3/2014 | Douglas et al. |
| 2014/0121820 A1 | 5/2014 | Das et al. |
| 2014/0236773 A1 | 8/2014 | Hamilton et al. |
| 2015/0057784 A1* | 2/2015 | Butler ................ B29C 67/0088 700/119 |

FOREIGN PATENT DOCUMENTS

| | | | |
|---|---|---|---|
| EP | 3036618 A1 | 6/2016 | |
| JP | 2010509090 A | 3/2010 | |
| JP | 2012096426 A | 5/2012 | |
| WO | WO-2008/055533 A1 | 5/2008 | |
| WO | WO-2012/061945 A1 | 5/2012 | |
| WO | WO-2013/086309 A1 | 6/2013 | |
| WO | WO-2015/026749 A1 | 2/2015 | |
| WO | WO-2015022572 A2 * | 2/2015 | ............. G06T 19/00 |

OTHER PUBLICATIONS

McNulty, et al., "Toward the Printed World: Additive Manufacturing and Implications for National Security", Sep. 2012, 17 pages http://www.dtic.mil/dtic/tr/fulltext.

\* cited by examiner

GENERATION OF THREE-DIMENSIONAL OBJECTS

RELATED APPLICATIONS

This application is a Continuation of commonly assigned and co-pending U.S. patent application Ser. No. 15/307,745, filed Oct. 28, 2016, which claims priority to and is a national stage filing under 35 U.S.C. § 371 of PCT Application Number PCT/US2014/056789, having an international filing date of Sep. 22, 2014, which claims priority to PCT Application No. PCT/US2014/053405 filed on Aug. 29, 2014, entitled "MODIFYING DATA REPRESENTING THREE-DIMENSIONAL OBJECTS", the entire contents of which are hereby incorporated by reference in their entireties.

BACKGROUND

Many different types of additive manufacturing techniques for generating three-dimensional objects on a layer-by-layer basis are known. Many of these techniques, however, are generally slow, and it may take a considerable time to generate even a small object.

BRIEF DESCRIPTION

Examples will now be described, by way of non-limiting example only, with reference to the accompanying drawings, in which.

DETAILED DESCRIPTION

Some additive manufacturing techniques generate three-dimensional objects within a volume of a build material (hereinafter referred to as a build volume). For example, some techniques form successive layers of a build material, such as a powdered or liquid build material, on a support platform, and then selectively solidify portions of each layer of build material, before forming a subsequent layer of build material. Additive manufacturing systems that generate three-dimensional objects in this manner may include, for example, selective laser sintering (SLS) systems, stereo lithography (SLA) systems, and powder-based three-dimensional printing systems.

To generate three-dimensional objects, one or multiple virtual objects may be spatially arranged within a virtual build volume. A virtual object may be, for example, a digital model of an object that is to be generated by an additive manufacturing system.

The virtual build volume corresponds to a build volume of a given additive manufacturing system within which objects may be generated.

An additive manufacturing system processes successive layers of build material corresponding to respective slices of the virtual build volume to generate objects within the build volume. The processing may include, for example, selectively solidifying portions of each layer of build material in accordance with object cross-sections that may be present in corresponding slices of the virtual build volume.

Since such systems generate objects within a build volume, generated objects may be removed from the build volume once all of the objects within the build volume have been generated.

The processing of a given build volume may take many hours, depending, for example, on the type of additive manufacturing system used and the size of the build volume. Accordingly, once an additive manufacturing system has started to process a build volume the additive manufacturing system is effectively busy until the whole build volume has been processed, or unless the build process is cancelled. However, cancelling processing of a build volume may result in a significant loss of time, and any objects not fully generated within the build volume will be incomplete. Furthermore, cancelling the processing of a whole build volume may result in significant loss of build material.

Figure 1:
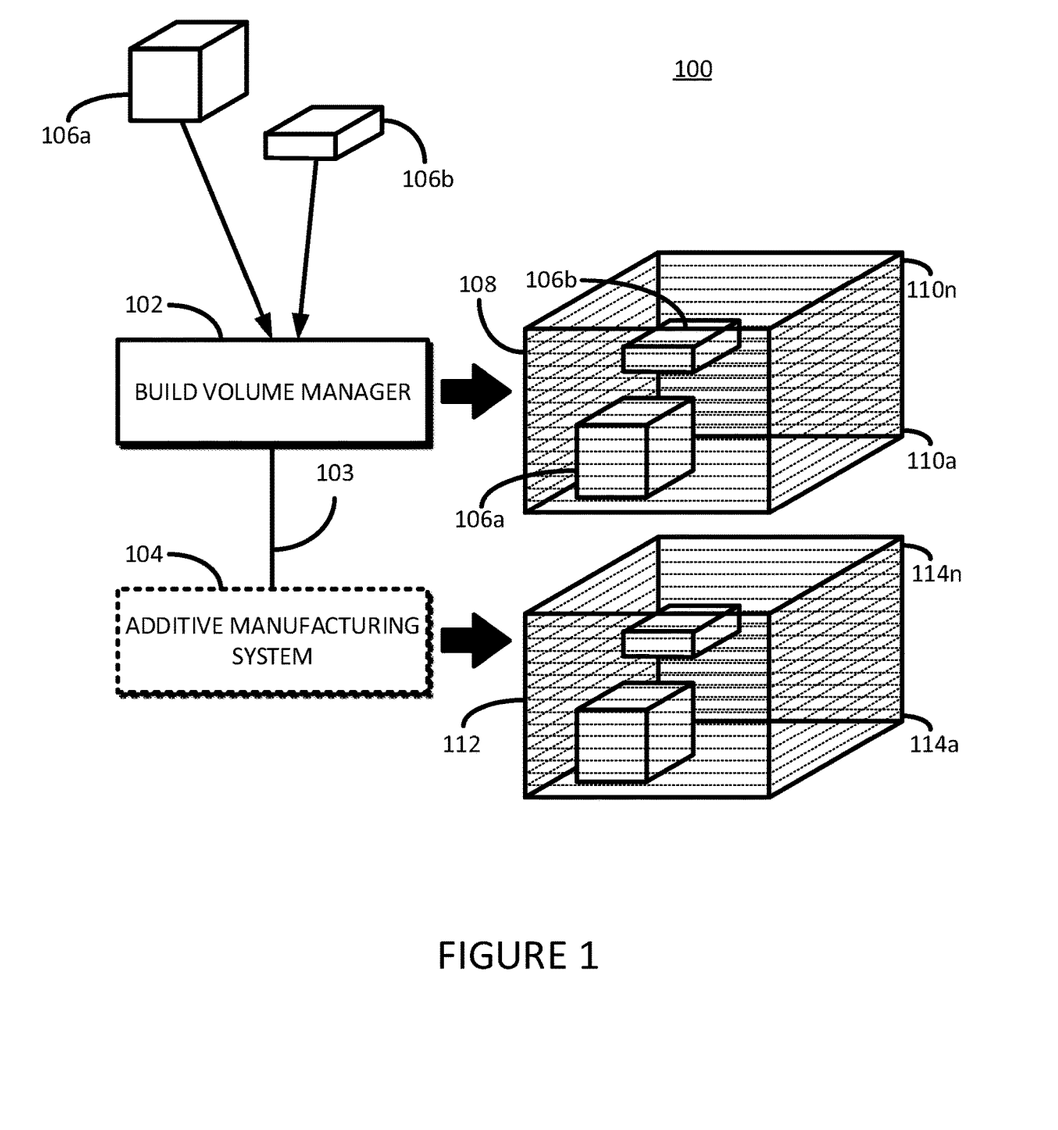
FIG. 1 is a schematic view of a system 100 according to an example.

Referring now to FIG. 1, there is shown a schematic view of a system 100 according to an example. The system 100 comprises a build volume manager 102 for managing an arrangement of objects within a build volume 112 to be generated by an additive manufacturing system 104. In one example, the build volume manager 102 may generate control signals or data 103 that may be used to control, either directly or indirectly, the additive manufacturing system 104.

Figure 2:
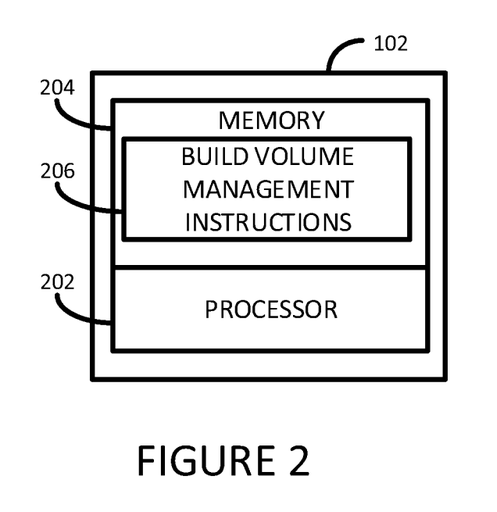
FIG. 2 is block diagram of a build volume manager according to one example.

In one example, as shown in FIG. 2, the build volume manager 102 comprises a processor 202, such as a microprocessor or microcontroller, coupled to a non-transitory computer readable memory 204, for example through a communications bus (not shown). The memory 204 stores build volume management instructions 206 which are machine readable instructions that, when executed by the processor 202, cause the build volume manager 102 to manage a build volume of an additive manufacturing system as described herein in various examples.

Figure 3:
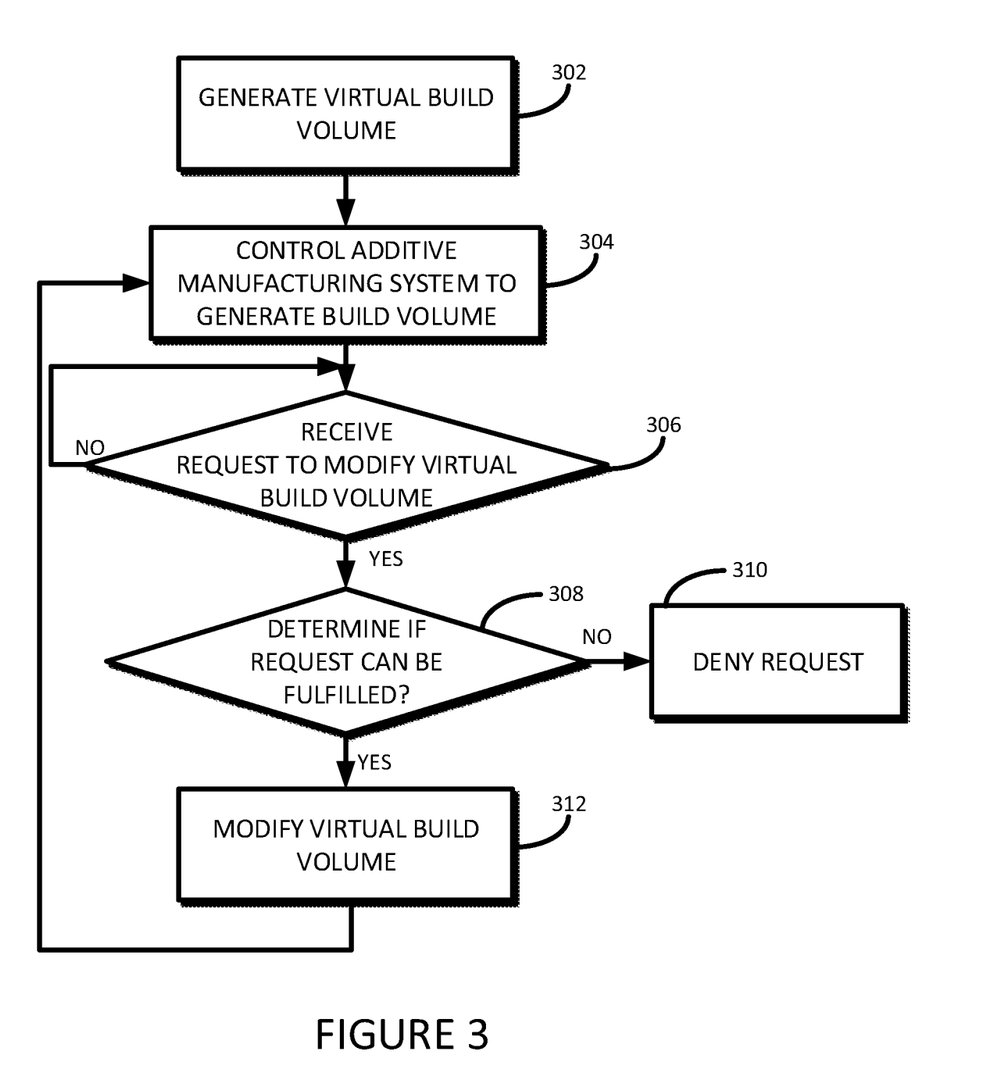
FIG. 3 is a flow diagram outlining a method according to one example.

Operation of the system 100 will now be described with additional reference to the flow diagram of FIG. 3.

At 302, the build volume manager 102 generates a virtual build volume 108. The virtual build volume 108 includes a spatial arrangement of one or multiple virtual three-dimensional objects, such as virtual objects 106a and 106b, to be generated within the build volume 112 by the additive manufacturing system 104. In one example the build volume manager 102 generates data representing a spatial arrangement of a virtual build volume from data representing one or multiple three-dimensional objects.

Each virtual object may be, for example, defined in any suitable data format, such as a vector data format. Each virtual three-dimensional object may be generated, for example, from a suitable computer-aided design (CAD) application, from a three-dimensional scanner, or from any suitable source.

In one example, the build volume manager 102 may be implemented as a software driver, or other software application, that a user uses to send a three-dimensional print job defining one or multiple objects to be generated by an additive manufacturing system.

In one example, the build volume manager may obtain multiple virtual objects, such as objects 106a and 106b, that are to be generated by the additive manufacturing system

104. The build volume manager 102 may determine a spatial arrangement of one or more of the obtained virtual objects within the virtual build volume 108, based on various criteria. The spatial arrangement may include the orientation and position of each object within the virtual build volume 108. Such criteria may include, without limitation: an object build deadline; an object priority; object interdependencies; structural characteristics required for a particular orientation of a part; acceptable geometrical error tolerance for a particular orientation of a part; spatial arrangement of objects to facilitate a post-processing operation, and volumetric optimization of the build volume.

In one example the build volume manager 102 may determine a spatial arrangement by determining a volumetric optimization of the virtual build volume 108. For example, the build volume manager 102 may perform one or multiple geometric operations, such as rotations, translations, etc. of objects to obtain an efficient spatial arrangement, whilst respecting appropriate criteria such as, without limitation: minimal object to object spacing; appropriate thermal spacing (depending on the additive manufacturing techniques employed); and desired strength axes. The build volume manager 102 may use, for example, finite element analysis (FEA) to assist the determination of the orientation of a part, for example to meet a desired object strength characteristic.

In one example the build volume manager 102 determines when to control the additive manufacturing system 104 to start processing the virtual build volume 108 to generate the build volume 112. In another example a user may determine when the build volume manager 102 is to start processing the virtual build volume 108 to generate the build volume 112.

At block 304, the build volume manager 102 controls the additive manufacturing system 104 to begin generating the virtual objects 106a and 106b within the virtual build volume 108. In one example, the additive manufacturing system 104 processes successive layers of a build material corresponding to slices of the virtual build volume 108.

In one example, the build volume manager 102 processes the virtual build volume 108 and sends corresponding control data 103 to the additive manufacturing system 104.

In one example, the build volume manager 102 may generate and send data representing individual slices 110a to 110n of the virtual build volume 108, where each slice corresponds to a layer 114a to 114n of build material to be processed by the additive manufacturing system 104 within the build volume 112. In one example each slice 110a to 110n corresponds to a single layer of build material 114a to 114n. In other examples, multiple slices may correspond to a single layer of build material.

In one example, the build volume manager 102 may generate and send data to the additive manufacturing system 104 that represents all of the slices 110a to 110n of the virtual build volume 108. In another example, the build volume manager 102 may generate and send data that represents a single slice of the virtual build volume 108, and may send data that represents a subsequent slice of the virtual build volume 108 when requested by the additive manufacturing system 102.

In one example the control data 103 may be adapted by the build volume manager 102 based on characteristics of the additive manufacturing system 104.

At block 306, the build volume manager 102 waits to receive, or otherwise obtains, a request to modify the virtual build volume 108. If such a request is received, for example through a suitable input to the build volume manager 102, at block 308 the build volume manage 102 determines if the request can be fulfilled.

A request to modify the virtual build volume 108 may take different forms, and may include, without limitation, one or more of: a request to cancel the generation of an object; a request to add a new object; a request to displace an object; a request to substitute one object for another object; a request to duplicate an object; and a request to modify a characteristic, such as a color characteristic, or object property characteristic, such as a strength characteristic, a smoothness characteristic, or the like.

The determination by the build volume manager 102 as to whether a request to modify the virtual build volume 108 may be fulfilled may depend on the type of request, and may also depend on the number of layers of the build volume 112 that have already been processed by the additive manufacturing system 104.

For example, to fulfill a request to add a new object into the virtual build volume 108 the build volume manager 102 has to determine whether there is sufficient space in the un-processed portion of the build volume 112 to accommodate the new object. For example, to fulfill a request to cancel the generation of an object in the build volume 112, to move an object, or to modify a characteristic of an object, the build volume manager 102 has to determine whether the object has already been generated, or at least partially generated, within the build volume 112.

In one example, the build volume manager 102 determines from the additive manufacturing system 104, the layer of the build volume 112 that is currently being processed. This enables the build volume manager 102 to determine the number of layers that have been processed by the additive manufacturing system 104. In other examples, however, the build volume manager 102 may obtain from the additive manufacturing system 104 a layer other than the current layer, for example the last complete layer that was processed, the next layer to be processed, or any other suitable layer. The layer may also be referred to as the z-count, as it represents the offset in the z-axis of the current layer of build material being processed.

By knowing the number of layers of the build volume 112 that have been processed by the additive manufacturing system 104 enables the build volume manager 102 to determine whether a request can be fulfilled.

Figure 4:
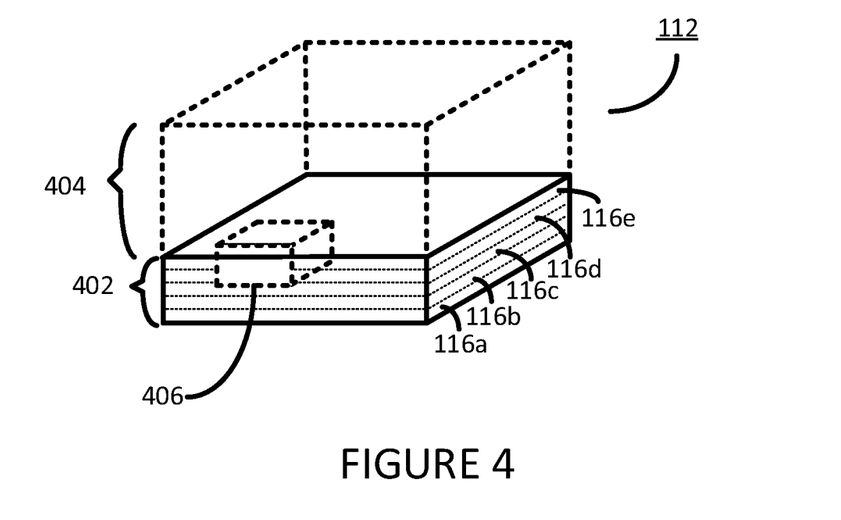
FIG. 4 is an illustration of a build volume according to one example.

FIG. 4 illustrates a build volume 112 of which a portion 402 thereof, comprising layers of build material 116a to 116e, has been processed by the additive manufacturing system 104. It can be seen that a portion of the object 406, corresponding to the virtual object 106a has been generated within the build volume 112, whereas no object corresponding to the virtual object 106b has yet been generated. It can also be seen that a portion 404 of the build volume 112 remains un-processed.

Accordingly, if the request is to modify the object 406, the request cannot be fulfilled. However, if the request is to cancel the generation of the virtual object 106b, this request can be fulfilled. Similarly, by knowing the height of each layer and the maximum height of the build volume 112, or by knowing the number of layers of build material within the build volume 112 the build volume manager 102 is able to determine the amount of available space in the build volume 112 within which modifications to the spatial of arrangement of objects may be made.

Figure 5:
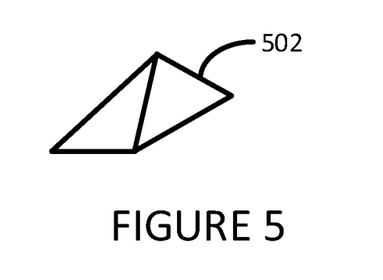
FIG. 5 is an illustration of a virtual object according to one example.

For example, a request may be received to cancel the generation of virtual object 106b, and to generate a new object 502 shown in FIG. 5.

Figure 6:
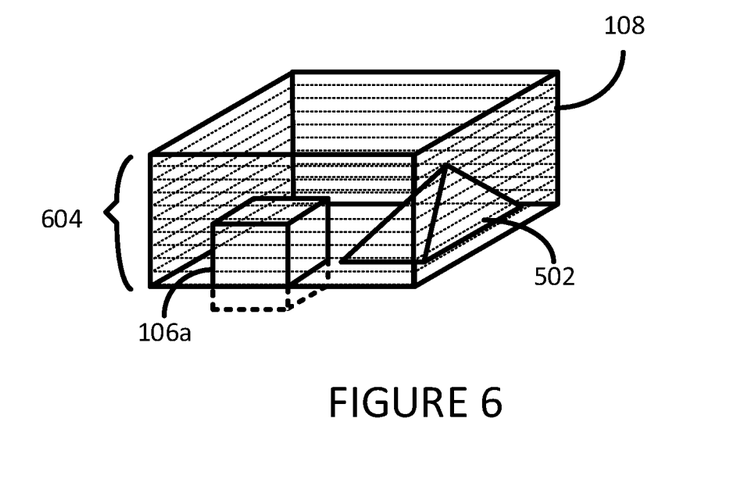
FIG. 6 is an illustration of a virtual build volume according to one example.

The build volume manager 102 determines (block 308) that the virtual object 106*b* has not yet been generated or partially generated and so may fulfill the request to cancel its generation by suitably modifying (block 312) the virtual build volume 108. The build volume manager 102 also determines (block 308) that the new virtual object 502 may be generated in the un-processed portion 404 of the build volume 112, and so modifies (block 312) the virtual build volume 108 that corresponds to the portion 404 of the build volume 112, as shown in FIG. 6. Since the virtual object 106*a* has only been partially generated in the build volume no modifications are made thereto in the virtual build volume 108.

As previously mentioned, the build volume manager 102 may perform one or multiple geometric operations on the new virtual object 502, or any on other virtual objects which have not yet been processed, such as rotations, translations, etc. of objects to obtain an efficient spatial arrangement, whilst respecting any appropriate criteria, such as those criteria previously mentioned, to determine whether the request may be fulfilled. For example, the build volume manager 102 may attempt to determine a new spatial arrangement of objects within the virtual build volume 108 that would allow the new virtual object to be included therein. Any objects which have been partially processed, such as the object 106*a*, may not be able to be modified, other than for to cancel the generation of the object.

At block 304 the build volume manager 102 controls the additive manufacturing system 104 to process the modified virtual build volume 108, for example by sending suitable data or control signals thereto.

In one example, the build volume manager 102 instructs the additive manufacturing system 104 to disregard any previously received control data and instructs the additive manufacturing system 104 to process new data representing the un-processed portion 604 of the virtual build volume 108.

In one example, the build volume manager 102 may send data to the additive manufacturing system 104 that represents all of the slices corresponding to the un-processed portion 604 of the virtual build volume 108.

In another example, the build volume manager 102 may send data that represents a single slice of the virtual build volume 108, and may send data that represents a subsequent slice of the virtual build volume 108 when requested by the additive manufacturing system 102.

In a yet further example, the build volume manager 102 may send data that represents slices of just the object, for example along with an offset within the build volume.

Some additive manufacturing techniques, such as selective laser sintering and powder-based three-dimensional printing system, may be sensitive to delays introduced between the processing of successive layers of build material. For example, inter-layer object strength may be related to the temperature at which layers of build material, or different portions of layers of build material are maintained. Accordingly, in one example the build volume manager 102 does not interrupt the processing of layers of the build volume 112 by the additive manufacturing system 104 until it has determined whether the request to modify to the build volume 112 can be fulfilled and has subsequently generated the new control data or signals to control the additive manufacturing system 104.

If the time it takes to process the request is greater than the time it takes the additive manufacturing system 104 to process a layer of build material in the build volume 112, then any layers of build material processed whilst the build volume manager 102 is processing the request may be need to be taken into account. This may be the case, for example, if the request relates to adding a new object or modifying the spatial arrangement of objects within the build volume.

The build volume manager 102 may be used, according to one example, as a dynamic object queue manager for an additive manufacturing system.

Figure 7:
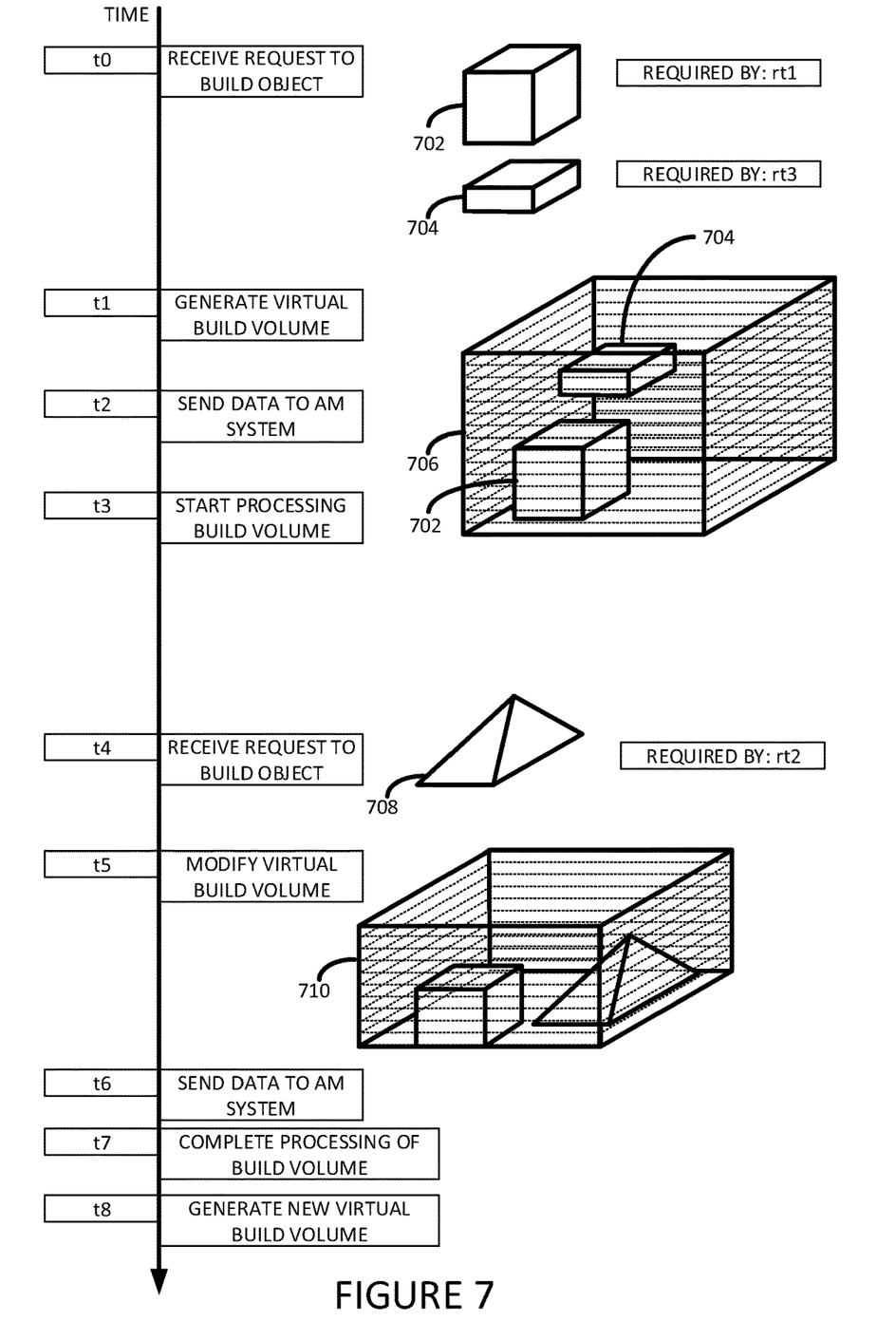
FIG. 7 is an illustration of a time line according to one example.

An example scenario is described below with additional reference to FIG. 7.

At time t0 the build volume manager 102 receives a request to build a virtual object 702 and a virtual object 704. The virtual object 702 has data associated with it that indicates that it is required for time rt1, and the virtual object 704 has data associated with it that indicates that it is required for time rt3.

At time t1 the build volume manager 102 generates a virtual build volume 706 that includes the virtual objects 702 and 704 and at time t2 sends data representing at least a portion of the virtual build volume 706 to the additive manufacturing system 104. At time t3, the additive manufacturing system 104 starts processing the build volume.

At time t4 the build volume manager 102 receives a request to build a yet further object 708. The virtual object 702 has data associated with it that indicates that it is required for time rt2.

The build volume manager 102 determines that the request may be fulfilled by removing the virtual object 704 from the virtual build volume 706, and adding the object 708 to the virtual build volume 706.

At time t5 the build volume manager 102 modifies the portion of the virtual build volume which has not yet been processed by the additive manufacturing system 104, to generate a modified virtual build volume 710.

At time t6 the build volume manager 102 sends data representing at least a portion of the modified virtual build volume 710 to the additive manufacturing system 104.

At time t7 the additive manufacturing system 104 completes processing of the build volume, and hence the generated objects corresponding to the virtual objects 702 and 708 may be removed from the processed build volume.

At time t8 the build volume manager 102 may generate a new virtual build volume containing the virtual object 704, such that it may be generated by the additive manufacturing system 104 by its required time rt3.

It will be apparent that the build volume manager as described herein may be used in numerous manners, and may be particularly useful in managing the generation of objects in a dynamic manner by an additive manufacturing systems. This may be particularly convenient as it enables a build volume being processed by an additive manufacturing system to be modified, in substantially real-time, without having to wait for the entire build volume to be processed.

In the example shown the build volume manager 102 is separate from the additive manufacturing system 104. In one example, the build volume manager 102 may be an application running on a locally or remotely connected processing device, such as a computer server.

In another example, the build volume manager 102 may be integrated with the additive manufacturing system 104.

It will be appreciated that examples described herein can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples described herein. Accordingly, some examples provide a program comprising code for implementing a system or method as described herein and a machine readable storage storing such a program.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features. CLAIMS

The invention claimed is:

1. A method comprising:
receiving a request to build a first virtual object and a second virtual object;
generating a virtual build volume that includes the first virtual object and the second virtual object;
sending data representing at least a portion of the virtual build volume to an additive manufacturing system, wherein the additive manufacturing system is to start processing the virtual build volume;
following the sending of the data, receiving a request to build a third virtual object, wherein the first virtual object has associated data indicating that the first virtual object is required for a first required time, the second virtual object has associated data indicating that the second virtual object is required for a third required time, and the third virtual object has associated data indicating that the third virtual object is required for a second required time, the second required time being earlier than the third required time and later than the first required time;
modifying the virtual build volume to remove the second virtual object from the virtual build volume and to add the third virtual object to the virtual build volume;
sending data representing at least a portion of the modified virtual build volume to the additive manufacturing system to process the modified virtual build volume; and
generating a new virtual build volume containing the second virtual object to enable the additive manufacturing system to build an object corresponding to the second virtual object prior to the third required time.

2. The method of claim 1, further comprising:
following receipt of the request to build the third virtual object, determining whether the second virtual object is to be removed from the virtual build volume to build the third virtual object; and
wherein modifying the virtual build volume further comprises modifying the virtual build volume based on a determination that the second virtual object is to be removed from the virtual build volume to build the third virtual object.

3. The method of claim 1, further comprising:
receiving the request to build the third virtual object prior to the additive manufacturing system building an object corresponding to the second virtual object; and
removing the second virtual object from the virtual build volume based on receipt of the request to build the third virtual object prior to the additive manufacturing system building an object corresponding to the second virtual object.

4. The method of claim 1, wherein modifying the virtual build volume further comprises modifying a portion of the virtual build volume that has not yet been processed by the additive manufacturing system to generate the modified virtual build volume.

5. The method of claim 1, wherein the virtual build volume corresponds to a build volume of the additive manufacturing system.

6. A build volume manager comprising:
a processor; and
a memory on which is stored instructions that are to cause the processor to:
receive a request to build a first virtual object and a second virtual object;
generate a virtual build volume that includes the first virtual object and the second virtual object;
send data representing at least a portion of the virtual build volume to an additive manufacturing system, wherein the additive manufacturing system is to start processing the virtual build volume;
prior to the additive manufacturing system processing a portion of the virtual build volume including the second virtual object, receive a request to build a third virtual object, wherein the first virtual object has associated data indicating that the first virtual object is required for a first required time, the second virtual object has associated data indicating that the second virtual object is required for a third required time, and the third virtual object has associated data indicating that the third virtual object is required for a second required time, the second required time being earlier than the third required time and later than the first required time;
modify the virtual build volume to remove the second virtual object from the virtual build volume and add the third virtual object to the virtual build volume;
send data representing at least a portion of the modified virtual build volume to the additive manufacturing system to process the modified virtual build volume; and
generate a new virtual build volume containing the second virtual object to enable the additive manufacturing system to build an object corresponding to the second virtual object prior to the third required time.

7. The build volume manager of claim 6, wherein the instructions are further to cause the processor to:
following receipt of the request to build the third virtual object, determine whether the portion of the virtual build volume including the second virtual object is to be removed from the virtual build volume to build the third virtual object; and
modify the virtual build volume based on a determination that the portion of the virtual build volume including the second virtual object is to be removed from the virtual build volume to build the third virtual object.

8. The build volume manager of claim 6, wherein the virtual build volume corresponds to a build volume of the additive manufacturing system.

9. The build volume manager of claim 6, wherein the instructions are further to cause the processor to:

receive the request to build the third virtual object prior to the additive manufacturing system building an object corresponding to the second virtual object; and remove the second virtual object from the virtual build volume based on receipt of the request to build the third virtual object prior to the additive manufacturing system building an object corresponding to the second virtual object.

10. The build volume manager of claim 6, wherein to modify the virtual build volume, the instructions are further to cause the processor to:

modify a portion of the virtual build volume that has not yet been processed by the additive manufacturing system to generate the modified virtual build volume.

11. A non-transitory computer readable medium on which is stored processor understandable instructions that, when executed by a processor cause the processor to:

receive a request to build a first virtual object and a second virtual object;

generate a virtual build volume that includes the first virtual object and the second virtual object;

send data representing at least a portion of the virtual build volume to an additive manufacturing system, wherein the additive manufacturing system is to start processing the virtual build volume;

following the data being sent, receive a request to build a third virtual object, wherein the first virtual object has associated data indicating that the first virtual object is required for a first required time, the second virtual object has associated data indicating that the second virtual object is required for a third required time, and the third virtual object has associated data indicating that the third virtual object is required for a second required time, the second required time being earlier than the third required time and later than the first required time;

modify the virtual build volume to remove the second virtual object from the virtual build volume and to add the third virtual object to the virtual build volume;

send data representing at least a portion of the modified virtual build volume to the additive manufacturing system to process the modified virtual build volume to build objects corresponding to the first virtual object and the third virtual object; and generate a new virtual build volume containing the second virtual object to enable the additive manufacturing system to build an object corresponding to the second virtual object prior to the third required time.

12. The non-transitory computer readable medium of claim 11, wherein the instructions are further to cause the processor to:

following receipt of the request to build the third virtual object, determine whether the second virtual object is to be removed from the virtual build volume to build the third virtual object; and modify the virtual build volume to remove the second virtual object from the virtual build volume based on a determination that the second virtual object is to be removed from the virtual build volume to build the third virtual object.

13. The non-transitory computer readable medium of claim 11, wherein the instructions are further to cause the processor to:

receive the request to build the third virtual object prior to the additive manufacturing system building an object corresponding to the second virtual object; and remove the second virtual object from the virtual build volume based on receipt of the request to build the third virtual object prior to the additive manufacturing system building an object corresponding to the second virtual object.

14. The non-transitory computer readable medium of claim 11, wherein to modify the virtual build volume, the instructions are further to cause the processor to:

modify a portion of the virtual build volume that has not yet been processed by the additive manufacturing system to generate the modified virtual build volume.

15. The non-transitory computer readable medium of claim 11, wherein the virtual build volume corresponds to a build volume of the additive manufacturing system.

* * * * *